US012782856B2

(12) United States Patent
Ishida

(10) Patent No.: US 12,782,856 B2
(45) Date of Patent: Nov. 3, 2026

(54) IMAGE FORMING APPARATUS

(71) Applicant: KYOCERA Document Solutions Inc., Osaka (JP)

(72) Inventor: Keiju Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/306,352

(22) Filed: Aug. 21, 2025

(65) Prior Publication Data

US 2026/0064056 A1 Mar. 5, 2026

(30) Foreign Application Priority Data

Aug. 29, 2024 (JP) ................................ 2024-147505

(51) Int. Cl.

*G03G 15/20* (2006.01)
*G03G 21/16* (2006.01)
*G03G 21/20* (2006.01)

(52) U.S. Cl.

CPC ..... *G03G 15/2053* (2013.01); *G03G 15/2017* (2013.01); *G03G 15/2064* (2013.01); *G03G 21/1633* (2013.01); *G03G 21/1647* (2013.01); *G03G 21/1685* (2013.01); *G03G 21/206* (2013.01)

(58) Field of Classification Search

CPC ........... G03G 15/2017; G03G 15/2053; G03G 15/2064; G03G 21/1633; G03G 21/1647; G03G 21/1685; G03G 21/206

See application file for complete search history.

(56) References Cited

U.S. PATENT DOCUMENTS

| | | | | |
|---|---|---|---|---|
| 7,720,415 B2 | 5/2010 | Murano | | |
| 2012/0282002 A1* | 11/2012 | Murasaki | ........... | G03G 15/2017 399/329 |
| 2021/0165352 A1 | 6/2021 | Sato | | |
| 2023/0288853 A1 | 9/2023 | Morita | | |
| 2025/0208549 A1* | 6/2025 | Ishida | ................ | G03G 15/2017 |
| 2025/0208561 A1* | 6/2025 | Ishida | ................ | G03G 15/2017 |

FOREIGN PATENT DOCUMENTS

| | | | | |
|---|---|---|---|---|
| EP | 2506084 A2 * | 10/2012 | ......... | G03G 21/1685 |
| JP | 2021086093 A | 6/2021 | | |
| JP | 2023131945 A | 9/2023 | | |

OTHER PUBLICATIONS

European Patent Office, Extended European Search Report Issued in Application No. 25195664.5, Jan. 28, 2026, Germany, 9 pages.

* cited by examiner

*Primary Examiner* — Sophia S Chen
(74) *Attorney, Agent, or Firm* — Alleman Hall LLP

(57) ABSTRACT

A unit movement mechanism causes a heating unit to move in conjunction with a movement of an operation member. A pair of fans are arranged with an interval provided therebetween in a first direction and blow air toward the heating unit. The heating unit includes a ventilation duct including a hollow portion formed along the first direction, a pair of inflow openings which are formed opposite to the pair of fans, and a discharge opening which is formed between the pair of inflow openings in the first direction. The unit movement mechanism includes a unit coupling member and a link mechanism. The unit coupling member is coupled to the heating unit while a gap is provided between the unit coupling member and the discharge opening.

5 Claims, 8 Drawing Sheets

IMAGE FORMING APPARATUS

INCORPORATION BY REFERENCE

This application is based upon and claims the benefit of priority from the corresponding Japanese Patent Application No. 2024-147505 filed on Aug. 29, 2024, the entire contents of which are incorporated herein by reference.

BACKGROUND

The present disclosure relates to an image forming apparatus that uses electrophotography and includes a heating unit and a fixing unit.

An image forming apparatus that uses electrophotography transfers a toner image from an image-carrying member onto a sheet, and fixes the toner image onto the sheet using a fixing device.

The fixing device may be sectioned into a heating unit including a heater and a fixing unit including a fixing member and a pressure roller. The heater heats the fixing member.

Further, the image forming apparatus is known to include a mechanism which moves the heating unit from a heating position to an evacuation position in conjunction with an operation to an operation portion. When the heating unit is evacuated to the evacuation position, the fixing unit can be drawn out from a main body.

SUMMARY

An image forming apparatus according to an aspect of the present disclosure includes a main body, a fixing unit, a heating unit, an operation member, a unit movement mechanism, and a pair of fans. The main body is formed with an exposure opening through which an inside is exposed to an outside. The fixing unit is arranged along a first direction on an inner side of the exposure opening in the main body, and includes a fixing member which is heated and a pressure member which biases a sheet toward the fixing member. The heating unit is arranged in the main body along the first direction while being arranged next to the fixing unit in a second direction orthogonal to the first direction, and includes a heater which heats the fixing member. The operation member is capable of moving by being operate. The unit movement mechanism is arranged on a side opposite to a side of the fixing unit in the second direction with respect to the heating unit in the main body, and causes the heating unit to move between a reference position provided along the fixing unit and an evacuation position farther away from the fixing unit than the reference position in conjunction with a movement of the operation member. The pair of fans are arranged with an interval provided therebetween in the first direction on a side opposite to a side of the heating unit in the second direction with respect to the unit movement mechanism in the main body, and blow air toward the heating unit. When the heating unit is present at the evacuation position, the fixing unit can be drawn out from inside the main body along the first direction. The heating unit includes a ventilation duct including a hollow portion formed along the first direction, a pair of inflow openings which are formed opposite to the pair of fans and are in communication with the hollow portion, and a discharge opening which is formed between the pair of inflow openings in the first direction and is in communication with the hollow portion. The unit movement mechanism includes a unit coupling member which is coupled to the heating unit while a gap is provided between the unit coupling member and the discharge opening at a position between the pair of inflow openings in the first direction, and a link mechanism which transmits the movement of the operation member to the unit coupling member.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming Apparatus 10]

An image forming apparatus 10 according to the embodiment executes print processing using electrophotography. The print processing is processing of forming an image on a sheet 900.

Figure 1:
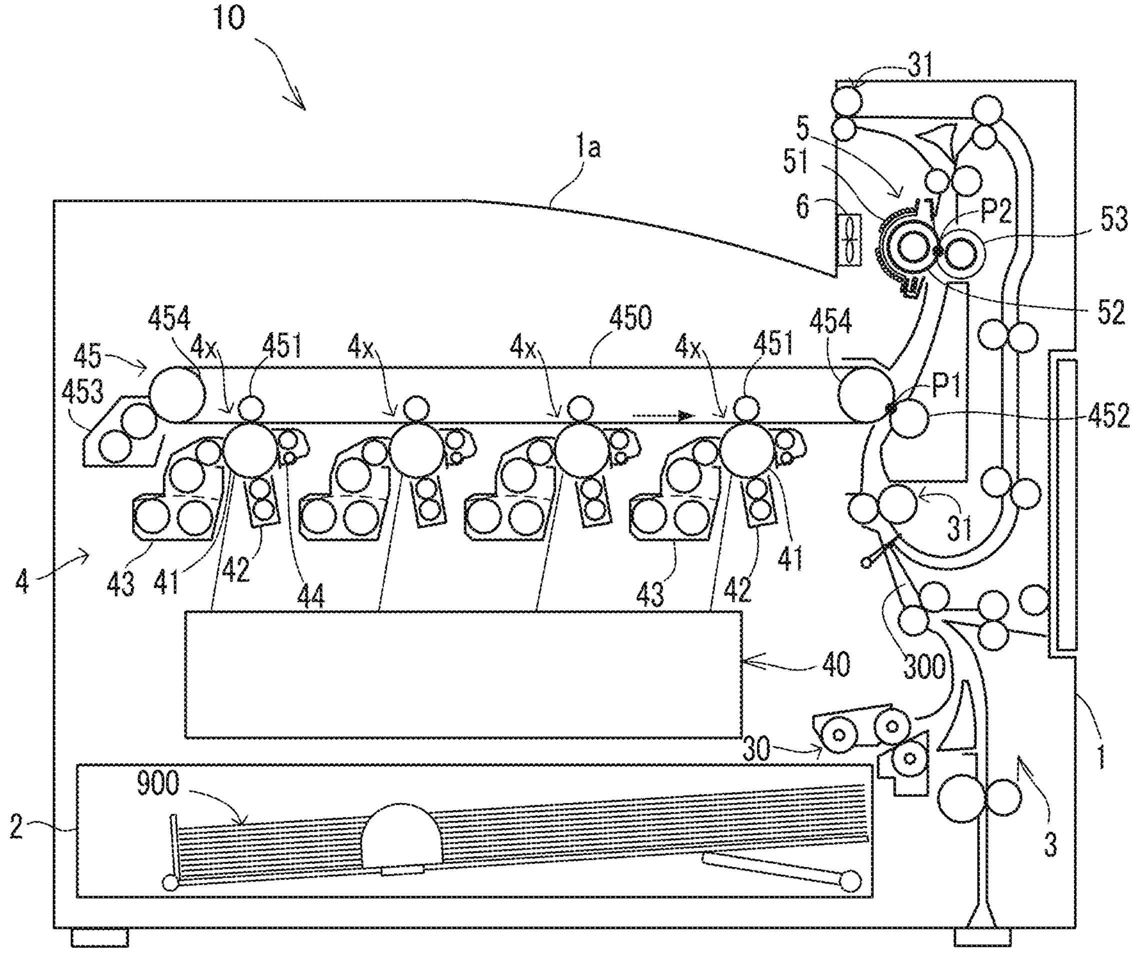
FIG. 1 is a configuration diagram of an image forming apparatus according to an embodiment.

As shown in FIG. 1, the image forming apparatus 10 includes a sheet storing portion 2, a sheet conveying device 3, and a printing device 4. The sheet conveying device 3 and the printing device 4 are housed in a main body 1 which is a housing. The main body 1 includes a main body frame 1*x* that forms a skeleton of the main body 1 and an exterior member attached to the main body frame 1*x*.

The sheet storing portion 2 is capable of storing a plurality of sheets 900. The sheet conveying device 3 includes a sheet feed device 30 and a plurality of conveying roller pairs 31.

The sheet feed device 30 sends out the sheets 900 stored in the sheet storing portion 2 one by one to a conveying path 300. The conveying path 300 is a path for the sheets 900.

The plurality of conveying roller pairs 31 convey the sheet 900 along the conveying path 300. One pair out of the plurality of conveying roller pairs 31 discharges the sheet 900 on which an image has been formed from the conveying path 300 onto a discharge tray 1*a*.

The printing device 4 executes the print processing on the sheet 900 conveyed along the conveying path 300. The image formed on the sheet 900 is a toner image.

The printing device 4 includes a laser scanning unit 40, one or more image forming portions 4*x*, a transfer device 45, and a fixing device 5. The image forming portion 4*x* includes a photoconductor 41, a charging device 42, a developing device 43, and a drum cleaning device 44.

The charging device 42 charges a surface of the photoconductor 41. The laser scanning unit 40 scans beam light on the charged surface of the photoconductor 41. Thus, the laser scanning unit 40 forms an electrostatic latent image on the surface of the photoconductor 41.

The developing device 43 supplies toner to the surface of the photoconductor 41 to develop the electrostatic latent image into a toner image. The transfer device 45 transfers the toner image formed on the surface of the photoconductor 41 onto the sheet 900.

The transfer device 45 transfers the electrostatic latent image onto the sheet 900 at a transfer position P1 on the conveying path 300.

In the present embodiment, the printing device 4 is a tandem-type color printing device including the plurality of image forming portions 4*x*. In addition, the transfer device 45 includes an intermediate transfer belt 450, a plurality of primary transfer devices 451, a secondary transfer device 452, and a belt cleaning device 453.

In the example shown in FIG. 1, the printing device 4 includes four image forming portions 4*x* respectively corresponding to the four colors of toner, that is, yellow, magenta, cyan, and black. The transfer device 45 includes four primary transfer devices 451 respectively corresponding to the four image forming portions 4*x*.

The intermediate transfer belt 450 is rotatably supported by a plurality of support rollers 454. One of the plurality of support rollers 454 rotates by being driven by a belt drive device (not shown). Thus, the intermediate transfer belt 450 rotates.

Each of the primary transfer devices 451 transfers the toner image formed on the surface of the photoconductor 41 in each of the image forming portions 4*x* onto a surface of the intermediate transfer belt 450. Thus, a synthetic toner image in which the toner images of the four colors are combined is formed on the surface of the intermediate transfer belt 450.

The intermediate transfer belt 450 rotates while carrying the synthetic toner image. The secondary transfer device 452 transfers the synthetic toner image formed on the surface of the intermediate transfer belt 450 onto the sheet 900 at the transfer position P1.

The drum cleaning device 44 removes primary waste toner from the surface of the photoconductor 41. The primary waste toner is toner remaining at a portion of the surface of the photoconductor 41 that has passed through the primary transfer device 451.

The belt cleaning device 453 removes secondary waste toner from the surface of the intermediate transfer belt 450. The secondary waste toner is toner remaining at a portion of the surface of the intermediate transfer belt 450 that has passed through the secondary transfer device 452.

The fixing device 5 applies heat and pressure to the synthetic toner image formed on the sheet 900 at a fixing position P2 on the conveying path 300. Thus, the fixing device 5 fixes the synthetic toner image onto the sheet 900. The fixing position P2 is a position on a downstream side of the transfer position P1 in a sheet conveying direction.

Figure 2:
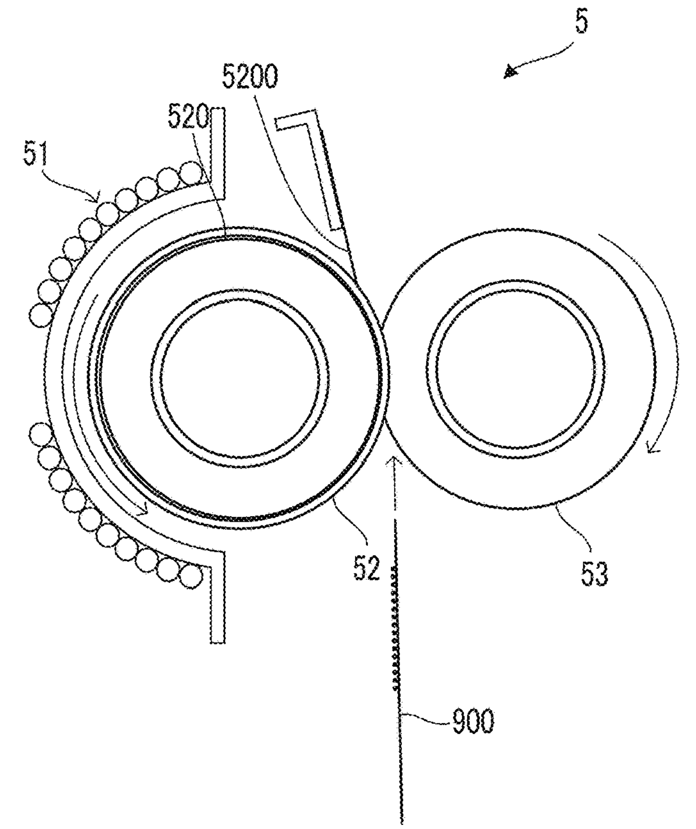
FIG. 2 is a diagram showing a part of a fixing device in the image forming apparatus according to the embodiment.

As shown in FIG. 2, the fixing device 5 includes a heater 51, a fixing belt 52, a fixing roller 520, a pressure roller 53, and a sheet separation member 5200.

The fixing belt 52 is a flexible cylindrical member that incorporates the fixing roller 520 therein. The fixing belt 52 is heated by the heater 51.

The fixing roller 520 is a cylindrical member that supports the fixing belt 52 from an inner side. The fixing roller 520 is supported rotatably. The fixing belt 52 is capable of rotating together with the fixing roller 520.

The fixing belt 52 includes a conductive base material, an elastic layer formed on an outer circumference of the base material, and a release layer formed on an outer circumference of the elastic layer.

The heater 51 is arranged opposed to an outer circumference surface of the fixing belt 52, and heats the fixing belt 52. In the present embodiment, the heater 51 is a heating device that uses an electromagnetic induction heating system. The heater 51 mainly heats the base material of the fixing belt 52 by electromagnetic induction. It is noted that, for example, a halogen heater or the like may be adopted as the heater 51.

The pressure roller 53 is supported rotatably. The pressure roller 53 is driven by a drive device (not shown) to thus rotate. The fixing belt 52 and the fixing roller 520 rotate in conjunction with the pressure roller 53.

The fixing belt 52 heats the toner image formed on the sheet 900. The pressure roller 53 biases the sheet 900 toward the fixing belt 52, to thus pressurize the toner image toward the sheet 900.

It is noted that the fixing belt 52 is an example of a fixing member that is heated by the heater 51. The pressure roller 53 is an example of a pressure member that biases the sheet 900 toward the fixing belt 52.

When the sheet 900 adheres onto the fixing belt 52, the sheet separation member 5200 peels off the sheet 900 from the fixing belt 52.

Figure 4:
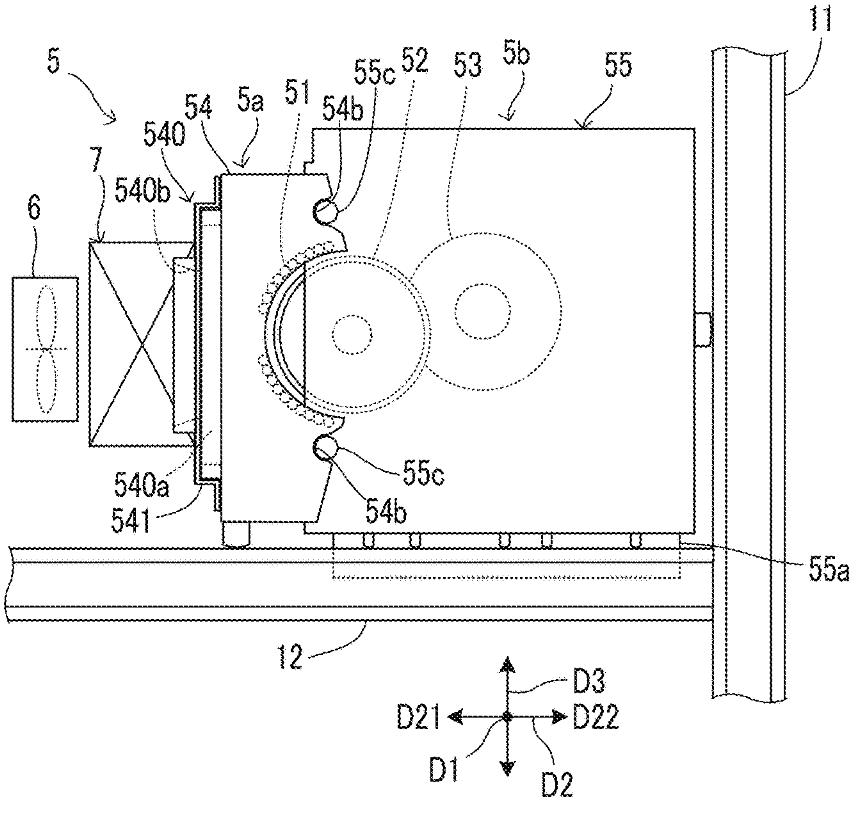
FIG. 4 is a front view of the fixing device in a proximity state in the image forming apparatus according to the embodiment.
Figure 5:
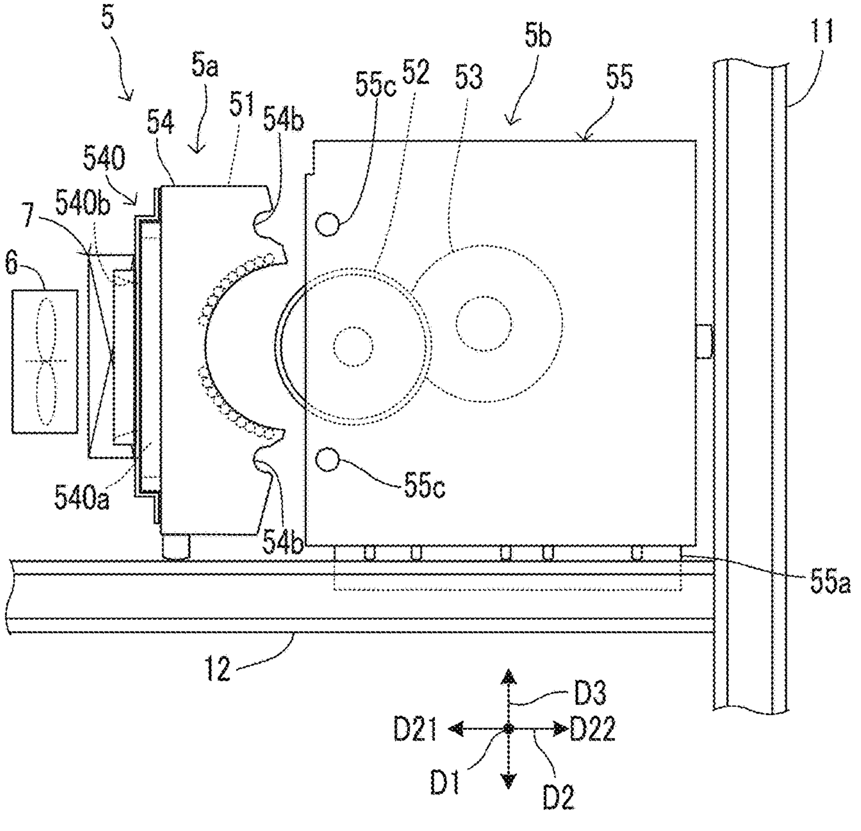
FIG. 5 is a front view of the fixing device in a separated state in the image forming apparatus according to the embodiment.

In the present embodiment, the fixing device 5 is sectioned into a heating unit 5*a* and a fixing unit 5*b* (see FIG. 4 and FIG. 5). The heating unit 5*a* is arranged in the main body 1 along a first direction D1. The fixing unit 5*b* is also arranged in the main body 1 along the first direction D1.

In other words, the heating unit 5*a* and the fixing unit 5*b* are arranged while longitudinal directions thereof are provided along the first direction D1.

The heating unit 5*a* and the fixing unit 5*b* are arranged next to each other in a second direction D2. In other words, the second direction D2 is an arrangement direction of the heating unit 5*a* and the fixing unit 5*b*. The second direction D2 is a direction orthogonal to the first direction D1.

In descriptions below, one side of the second direction D2 will be referred to as a first side D21, and the other side of the second direction D2 will be referred to as a second side D22 (see FIG. 3 to FIG. 5 and FIG. 7 to FIG. 12). The heating unit 5*a* is arranged on the first side D21 with respect to the fixing unit 5*b* (see FIG. 4, FIG. 5, FIG. 7, and FIG. 8).

The heating unit 5*a* includes the heater 51 and a first support member 54. The fixing unit 5*b* includes the fixing belt 52, the fixing roller 520, the pressure roller 53, and a second support member 55.

The first support member 54 is a member that supports the heater 51. The second support member 55 is a member that supports the fixing belt 52, the fixing roller 520, and the pressure roller 53. The fixing belt 52 is supported by the second support member 55 via the fixing roller 520.

Figure 3:
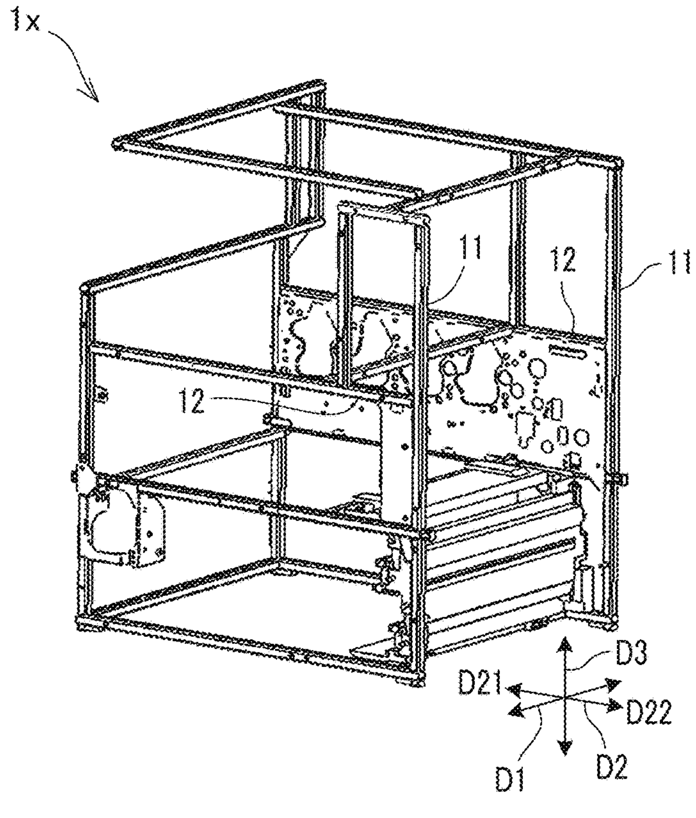
FIG. 3 is a perspective view of a main body frame in the image forming apparatus according to the embodiment.

The main body frame 1*x* is formed by combining a plurality of metal pipes (see FIG. 3). The heating unit 5*a* and the fixing unit 5*b* are supported by the main body frame 1*x*. The fixing unit 5*b* is arranged on the second side D22 of the heating unit 5*a* in the second direction D2.

The plurality of metal pipes constituting the main body frame 1*x* include restriction portions 11 and lower support portions 12 (see FIG. 3 to FIG. 5).

In the present embodiment, the restriction portions 11 are two support pipes that are formed to extend in a vertical direction D3 and are arranged with an interval in the first direction D1 (see FIG. 3). The vertical direction D3 is an up-down direction.

The lower support portions 12 are two beam pipes that are formed to extend in the second direction D2 below the heating unit 5*a* and the fixing unit 5*b* and are arranged with an interval in the first direction D1 (see FIG. 3).

Figure 7:
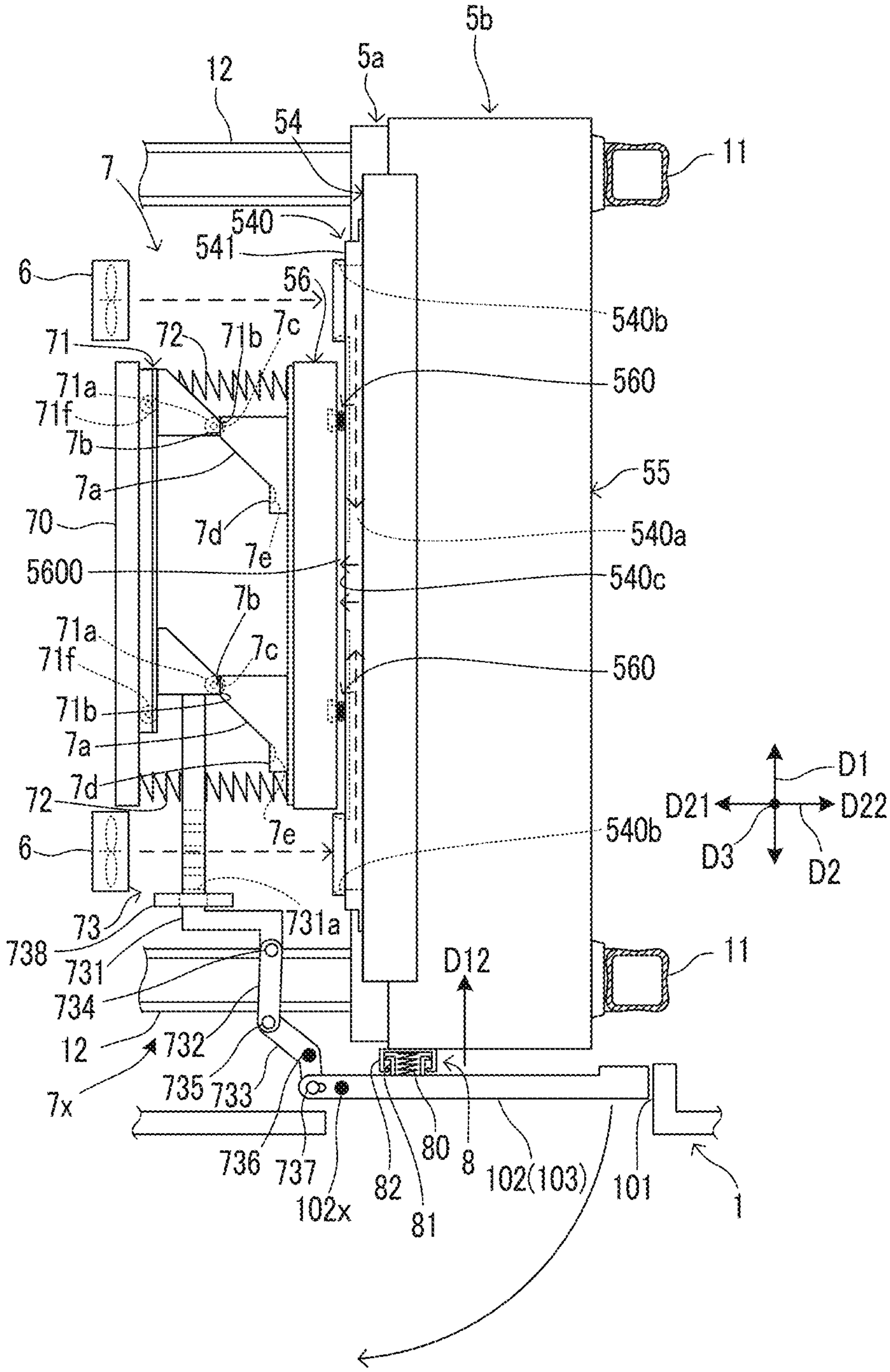
FIG. 7 is a plan view of the fixing device and a unit movement mechanism in a biased state in the image forming apparatus according to the embodiment.
Figure 8:
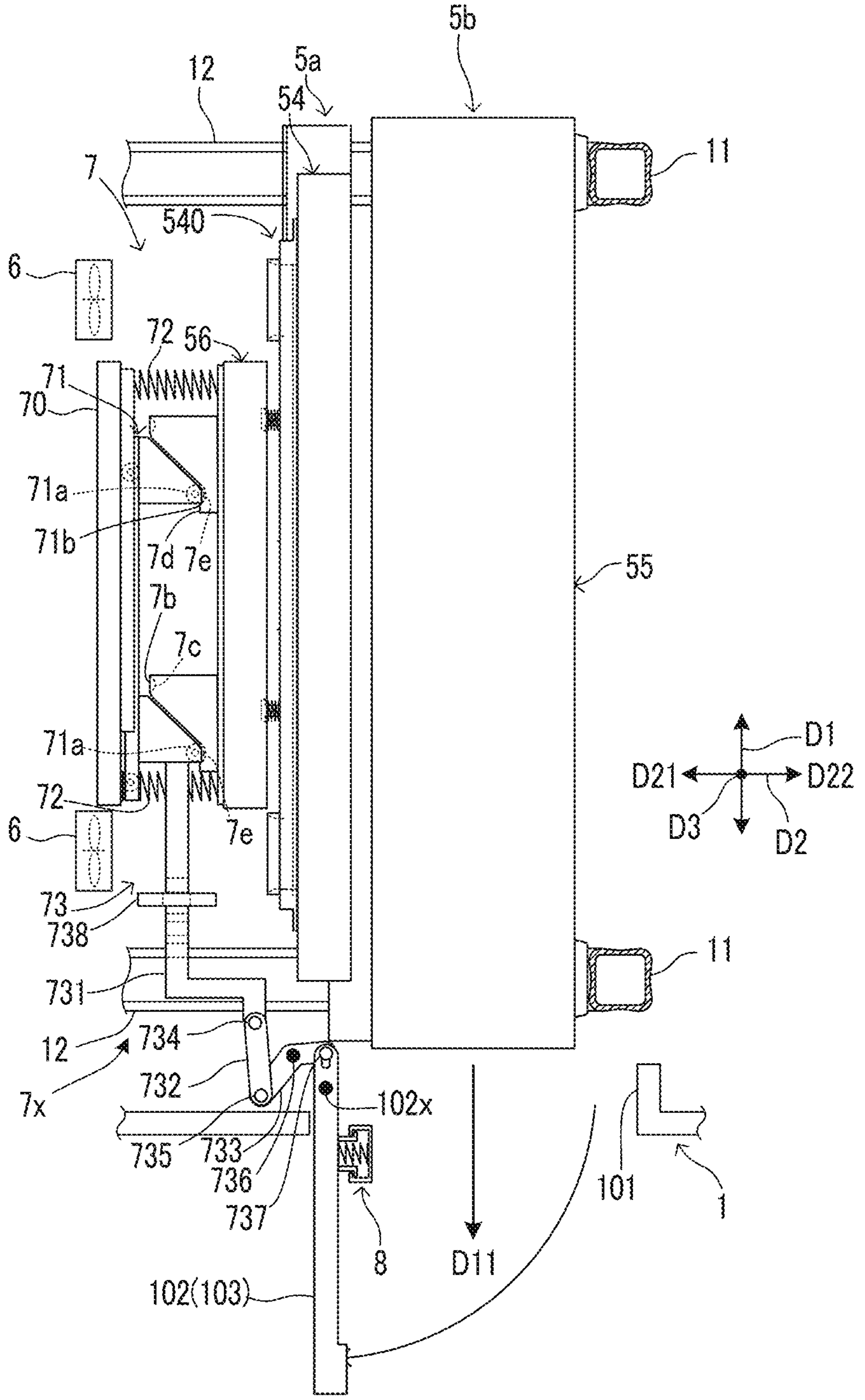
FIG. 8 is a plan view of the fixing device and the unit movement mechanism in a pulled state in the image forming apparatus according to the embodiment.

The heating unit 5*a* and the fixing unit 5*b* are placed on the lower support portions 12 while longitudinal directions thereof are provided along the first direction D1 (see FIG. 7 and FIG. 8). In other words, the lower support portions 12 support the heating unit 5*a* and the fixing unit 5*b* from below.

The heating unit 5*a* is capable of moving along the second direction D2 on the lower support portions 12. Specifically, the heating unit 5*a* is capable of moving between a reference position provided along the fixing unit 5*b* and an evacuation position that is farther away from the fixing unit 5*b* toward the first side D21 than the reference position. The fixing unit 5*b* is arranged between the heating unit 5*a* and the restriction portions 11 (see FIG. 4 and FIG. 5).

When the heating unit 5*a* is present at the evacuation position, the fixing unit 5*b* can be drawn out from inside the main body 1 along the first direction D1 (see FIG. 5 and FIG. 8).

The main body 1 includes an exposure opening 101 from which the inside is exposed to the outside (see FIG. 7 and FIG. 8). The fixing unit 5*b* is arranged along the first direction D1 on an inner side of the exposure opening 101 in the main body 1. The heating unit 5*a* is arranged along the first direction D1 inside the main body 1 while being arranged next to the fixing unit 5*b* in the second direction D2 (see FIG. 7 and FIG. 8).

The exposure opening 101 is an opening that opens one end of the fixing unit 5*b* in the first direction D1 to the outside of the main body 1. The image forming apparatus 10 includes a cover member 102 capable of opening and closing the exposure opening 101 (see FIG. 7 and FIG. 8).

The cover member 102 is supported by a first support shaft 102*x*. Thus, the cover member 102 can rotate about the first support shaft 102*x*. The cover member 102 is capable of rotating between a closing position at which the exposure opening 101 is closed and an opening position at which the exposure opening 101 is opened.

FIG. 7 shows the cover member 102 positioned at the closing position and the fixing device 5, and FIG. 8 shows the cover member 102 positioned at the opening position and the fixing device 5.

When the cover member 102 is positioned at the closing position, the cover member 102 is retained at the closing position by a lock mechanism (not shown). When the lock by the lock mechanism is released, the cover member 102 can be rotated from the closing position to the opening position.

When the cover member 102 is present at the opening position, the fixing unit 5*b* can be drawn out from the main body 1 through the exposure opening 101 (see FIG. 8).

Incidentally, it is important that the heating unit 5*a* is cooled efficiently in order to prevent an adverse effect of heat on peripheral devices of the fixing device 5 in the image forming apparatus 10.

Meanwhile, in order to enable the fixing unit 5*b* to be drawn out from the main body 1, the image forming apparatus 10 includes a unit movement mechanism 7 (see FIG. 7 and FIG. 8). The unit movement mechanism 7 causes the heating unit 5*a* to move between the reference position and the evacuation position.

The unit movement mechanism 7 is arranged on a side opposite to the fixing unit 5*b* side in the second direction D2 with respect to the heating unit 5*a*. That is, the unit movement mechanism 7 is arranged on the first side D21 of the second direction D2 with respect to the heating unit 5*a*. It is desirable to efficiently cool the heating unit 5*a* without the unit movement mechanism 7 becoming an obstacle.

The image forming apparatus 10 has a configuration for efficiently cooling the heating unit 5*a* without the unit movement mechanism 7 becoming an obstacle.

The image forming apparatus 10 includes a pair of fans 6 that are spaced apart from each other in the first direction D1 and blow air toward the heating unit 5*a* (see FIG. 7 and FIG. 8). The pair of fans 6 are arranged on the first side D21 of the second direction D2 with respect to the unit movement mechanism 7 in the main body 1 (see FIG. 1, FIG. 4, FIG. 5, FIG. 7, and FIG. 8). In other words, the pair of fans 6 are arranged on a side opposite to the heating unit 5*a* side in the second direction D2 with respect to the unit movement mechanism 7.

[Configuration of Unit Movement Mechanism 7]

The image forming apparatus 10 includes the unit movement mechanism 7 and an operation member 103 coupled to the unit movement mechanism 7 (see FIG. 7 and FIG. 8). In the present embodiment, the cover member 102 doubles as the operation member 103.

The operation member 103 is capable of moving in a first operation direction or a second operation direction when operated. The operation member 103 is arranged at one end of the main body 1 in the first direction D1 (see FIG. 7 and FIG. 8).

In the present embodiment, the first operation direction is a movement direction of the cover member 102 when closing the cover member 102. The second operation direction is a movement direction of the cover member 102 when opening the cover member 102.

In other words, the first operation direction is a direction in which the cover member 102 moves from the opening position to the closing position. The second operation direction is a direction in which the cover member 102 moves from the closing position to the opening position.

The unit movement mechanism 7 causes the heating unit 5*a* to move along the second direction D2 in conjunction with the movement of the operation member 103.

The unit movement mechanism 7 causes the heating unit 5*a* to move from the evacuation position to the reference position in conjunction with the movement of the operation member 103 in the first operation direction (see FIG. 7). On the other hand, the unit movement mechanism 7 causes the heating unit 5*a* to move from the reference position to the evacuation position in conjunction with the movement of the operation member 103 in the second operation direction (see FIG. 8).

The unit movement mechanism 7 includes a unit coupling member 56 and a link mechanism 7*x*. The unit coupling member 56 is coupled to the heating unit 5*a*. The link mechanism 7*x* transmits the movement of the operation member 103 to the unit coupling member 56.

The heating unit 5*a* further includes a duct forming member 541 attached to a surface of the first support member 54 on the first side D21 (see FIG. 7 and FIG. 8). The heating unit 5*a* includes a ventilation duct 540 constituted of the duct forming member 541 and the first support member 54 (see FIG. 7 and FIG. 8).

The ventilation duct 540 includes a hollow portion 540*a* formed between the first support member 54 and the duct forming member 541, a pair of inflow openings 540*b* that are in communication with the hollow portion 540*a*, and a discharge opening 540*c* that is in communication with the hollow portion 540*a* (see FIG. 7). The pair of inflow openings 540*b* and the discharge opening 540*c* are openings formed in the duct forming member 541.

The hollow portion 540*a* is formed along the first direction D1 (see FIG. 7). That is, the hollow portion 540*a* is formed along the heater 51 with the first direction D1 being a longitudinal direction thereof.

The pair of inflow openings 540*b* are formed to respectively oppose the pair of fans 6. That is, the pair of fans 6 and the pair of inflow openings 540*b* are respectively arranged on both outer sides of the unit coupling member 56 in the first direction D1.

The pair of fans 6 blow air toward the second side D22 of the second direction D2. The pair of inflow openings 540*b* are opened toward the first side D21 of the second direction D2 at positions respectively corresponding to the pair of fans 6 in the first direction D1.

The discharge opening 540*c* is formed between the pair of inflow openings 540*b* in the first direction D1. In the present embodiment, the discharge opening 540*c* is opened toward the first side D21 of the second direction D2.

The unit coupling member 56 is coupled to the heating unit 5*a* at a position between the pair of inflow openings 540*b* in the first direction D1 while a gap 5600 is provided between the unit coupling member 56 and the discharge opening 540*c* (see FIG. 7). The discharge opening 540*c* is opened toward the gap 5600.

Figure 10:
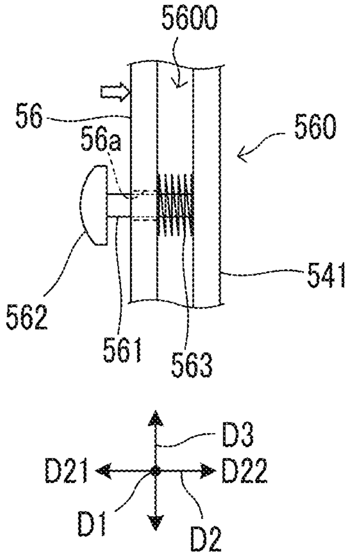
FIG. 10 is a plan view of a coupling mechanism of a unit coupling member when the unit movement mechanism in the image forming apparatus according to the embodiment is in the biased state.
Figure 11:
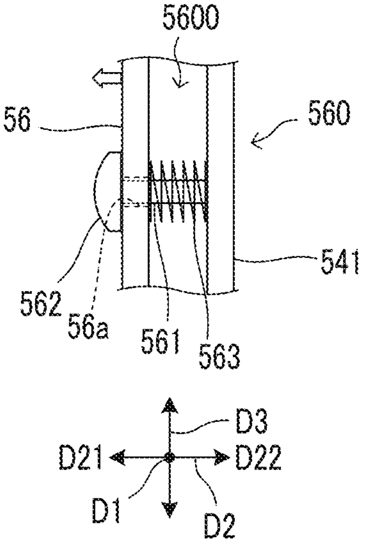
FIG. 11 is a plan view of the coupling mechanism of the unit coupling member when the unit movement mechanism in the image forming apparatus according to the embodiment is in the pulled state.

In the present embodiment, the unit coupling member 56 is coupled to the duct forming member 541 of the heating unit 5*a* by a coupling mechanism 560 (see FIG. 7, FIG. 10, and FIG. 11).

The cooling air sent out by the pair of fans 6 flows into the hollow portion 540*a* via the pair of inflow openings 540*b*. Furthermore, the cooling air efficiently cools the heating unit 5*a* while flowing through the hollow portion 540*a* from both end portions in the first direction D1 toward a center portion in the first direction D1.

Further, after cooling the heating unit 5*a*, the cooling air flows out of the hollow portion 540*a* into the gap 5600 via the discharge opening 540*c*. The cooling air flows out of the gap 5600 mainly along the vertical direction D3.

Therefore, the heating unit 5*a* is efficiently cooled by the cooling air that flows through a path in which the unit movement mechanism 7 does not become an obstacle.

The link mechanism 7*x* includes a guide member 70, a movable member 71, a first bias member 72, and a first direction movement mechanism 73.

The first bias member 72 biases the heating unit 5*a* toward the first side D21. Specifically, the first bias member 72 is one or more elastic members that bias the heating unit 5*a* toward the first side D21. For example, the elastic member is a coil spring, a leaf spring, or the like.

In the example shown in FIG. 7 and FIG. 8, the first bias member 72 is two tension springs that elastically bias the heating unit 5*a* toward the first side D21.

The unit coupling member 56 includes tilted surfaces 7*a*. The tilted surfaces 7*a* are provided so as to face the first side D21 of the heating unit 5*a*. The tilted surfaces 7*a* are each a surface that is tilted from the second side D22 to the first side D21 with respect to the first direction D1. In the present embodiment, the tilted surfaces 7*a* are provided at two positions spaced apart from each other in the first direction D1 (see FIG. 7 and FIG. 8).

The movable member 71 is supported so as to be movable along the first direction D1. The guide member 70 guides the movable member 71 along the first direction D1. For example, the guide member 70 is supported by the main body frame 1*x*.

Figure 9:
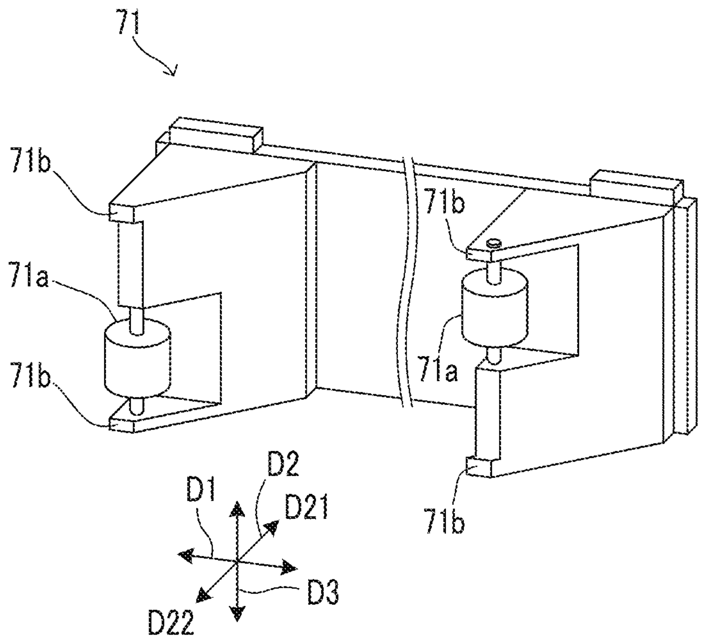
FIG. 9 is a perspective view in which a part of a movable member in the image forming apparatus according to the embodiment is omitted.

The movable member 71 includes one or more rollers 71*a* that are supported rotatably (see FIG. 7 to FIG. 9). The rollers 71*a* are provided at positions respectively corresponding to the tilted surfaces 7*a* in the movable member 71. In the present embodiment, the rollers 71*a* are provided at two positions spaced apart from each other in the first direction D1 (see FIG. 7 to FIG. 9). The rollers 71*a* roll while being in contact with the tilted surfaces 7*a*.

The first direction movement mechanism 73 causes the movable member 71 to move along the first direction D1 in conjunction with the movement of the operation member 103. In the present embodiment, the first direction movement mechanism 73 is a mechanism that converts a rotation of the operation member 103 into a linear movement along the first direction D1.

The first direction movement mechanism 73 includes a first link member 731, a second link member 732, and a third link member 733 (see FIG. 7 and FIG. 8).

One end of the first link member 731 is connected to the movable member 71, and the other end of the first link member 731 is coupled to one end of the second link member 732 by a first coupling shaft 734. The other end of the second link member 732 is connected to one end of the third link member 733 by a second coupling shaft 735. The other end of the third link member 733 is coupled to one end of the operation member 103 by a third coupling shaft 737.

The third link member 733 is rotatably supported by a second support shaft 736.

In the present embodiment, when the operation member 103 moves from the opening position to the closing position, the first direction movement mechanism 73 causes the movable member 71 to move toward the rear side along the first direction D1. Further, when the operation member 103 moves from the closing position to the opening position, the first direction movement mechanism 73 causes the movable member 71 to move toward the front side along the first direction D1.

As described above, the movement direction from the opening position to the closing position is the first operation direction. The movement direction from the closing position to the opening position is the second operation direction.

In descriptions below, an end portion of the tilted surface 7*a* on the second side D22 will be referred to as a base end portion of the tilted surface 7*a*, and an end portion of the tilted surface 7*a* on the first side D21 will be referred to as a terminal portion of the tilted surface 7*a*. The base end portion is an example of a portion of the tilted surface 7*a* on the second side D22. The terminal portion is an example of a portion of the tilted surface 7*a* on the first side D21.

When the movable member 71 moves in conjunction with the movement of the operation member 103 in the first operation direction, the roller 71*a* rolls from the base end portion to the terminal portion on the tilted surface 7*a*. By rolling from the base end portion to the terminal portion on the tilted surface 7*a*, the roller 71*a* presses the tilted surface 7*a* toward the second side D22. By pressing the tilted surface 7*a* toward the second side D22, the roller 71*a* causes the heating unit 5*a* to move toward the second side D22 against a bias force of the first bias member 72.

Neither the heating unit 5*a* nor the fixing unit 5*b* is fixed to the main body frame 1*x* by a fixing tool such as a screw.

The restriction portions 11 restrict a movement range of the fixing unit 5*b* toward the second side D22. By the rollers 71*a* causing the heating unit 5*a* to move toward the second side D22, the fixing unit 5*b* and the heating unit 5*a* are sandwiched between the movable member 71 and the restriction portions 11 (see FIG. 4 and FIG. 7).

FIG. 7 shows the unit movement mechanism 7 in a biased state where the movable member 71 is biasing the heating unit 5*a* and the fixing unit 5*b* toward the restriction portions 11. FIG. 4 and FIG. 7 show the fixing device 5 in a proximity state where the heating unit 5*a* is retained in proximity to the fixing unit 5*b* by the unit movement mechanism 7.

The fixing unit 5*b* and the heating unit 5*a* are positioned in the second direction D2 by being sandwiched between the movable member 71 and the restriction portions 11.

In other words, when the movable member 71 moves in conjunction with the movement of the operation member 103 in the first operation direction, the fixing unit 5*b* and the heating unit 5*a* are sandwiched between the movable member 71 and the restriction portions 11 to thus be positioned in the second direction D2.

The first support member 54 includes a plurality of concave first fitting portions 54*b* that are opened toward the second side D22 (see FIG. 4 and FIG. 5). The second support member 55 includes a plurality of convex second fitting portions 55*c* that can be respectively fit into the plurality of first fitting portions 54*b* (see FIG. 4 and FIG. 5).

By the unit movement mechanism 7 causing the heating unit 5*a* to move toward the second side D22, the plurality of first fitting portions 54*b* and the plurality of second fitting portions 55*c* fit (see FIG. 4).

By the plurality of first fitting portions 54*b* and the plurality of second fitting portions 55*c* fitting with one another, a relative movement of the heating unit 5*a* and the fixing unit 5*b* in the vertical direction D3 is restricted.

It is noted that alternatively, the second support member 55 may include the first fitting portions 54*b*, and the first support member 54 may include the second fitting portions 55*c*.

On the other hand, when the movable member 71 moves in conjunction with the movement of the operation member 103 in the second operation direction, the roller 71*a* rolls from the terminal portion to the base end portion on the tilted surface 7*a*, and the first bias member 72 causes the heating unit 5*a* to move toward the first side D21.

FIG. 8 shows the unit movement mechanism 7 in a pulled state where the first bias member 72 is pulling the heating unit 5*a* toward the first side D21. FIG. 5 and FIG. 8 show the fixing device 5 in a separated state where the heating unit 5*a* is separated from the fixing unit 5*b* toward the first side D21 by the unit movement mechanism 7. The separated state is a state where the heating unit 5*a* is present at the evacuation position.

In the present embodiment, the movable member 71 further includes first contact surfaces 71*b* (see FIG. 7 to FIG. 9). The unit coupling member 56 further includes second contact surfaces 7*b* respectively corresponding to the first contact surfaces 71*b* and first concave portions 7*c* respectively corresponding to the rollers 71*a* (see FIG. 7 and FIG. 8).

The first contact surface 71*b* is a surface that faces the second side D22 and is capable of coming into contact with the second contact surface 7*b* of the unit coupling member 56. For example, the first contact surfaces 71*b* are formed at three or more positions in the movable member 71. In the example shown in FIG. 9, the first contact surfaces 71*b* are formed at four positions in the movable member 71.

The second contact surface 7*b* is a surface that faces the first side D21 and is capable of coming into contact with the first contact surface 71*b* of the movable member 71. The second contact surfaces 7*b* are formed at positions respectively corresponding to the first contact surfaces 71*b* in the unit coupling member 56.

The first concave portion 7*c* faces the first side D21 and is arranged adjacent to the terminal portion of the tilted surface 7*a* in the first direction D1 (see FIG. 7 and FIG. 8). The first concave portion 7*c* is provided at positions respectively corresponding to the rollers 71*a* in the unit coupling member 56. In the present embodiment, the first concave portions 7*c* are provided at two positions in the unit coupling member 56.

A part of the roller 71*a* can be inserted into the first concave portion 7*c*. Specifically, a part of the roller 71*a* including an edge on the second side D22 can be inserted into the first concave portion 7*c*.

When the movable member 71 moves in conjunction with the movement of the operation member 103 in the first operation direction, the following first operation is caused. In the first operation, after the roller 71*a* rolls from the base end portion to the terminal portion on the tilted surface 7*a*, a part of the roller 71*a* enters the first concave portion 7*c*, and the first contact surface 71*b* abuts against the second contact surface 7*b* (see FIG. 7).

By the first contact surface 71*b* abutting against the second contact surface 7*b*, the fixing unit 5*b* and the heating unit 5*a* are sandwiched between the movable member 71 and the restriction portions 11. Thus, the fixing unit 5*b* and the heating unit 5*a* are positioned in the second direction D2.

Generally, an allowance is formed between the roller 71*a* and a rotation shaft of the roller 71*a*. The fixing unit 5*b* and the heating unit 5*a* are positioned in a state where the first contact surfaces 71*b* and the second contact surfaces 7*b* are in contact with one another, and thus the fixing unit 5*b* and the heating unit 5*a* are positioned with high accuracy.

Furthermore, when the fixing unit 5*b* and the heating unit 5*a* are positioned by the contact between the first contact surfaces 71*b* and the second contact surfaces 7*b*, no large force is applied to the rollers 71*a*. Therefore, durability of the rollers 71*a* is improved.

On the other hand, when the movable member 71 moves in conjunction with the movement of the operation member 103 in the second operation direction, the following second operation is caused. In the second operation, the roller 71*a* is detached from the first concave portion 7*c*, and the first contact surface 71*b* moves away from the second contact surface 7*b*. After that, the roller 71*a* rolls from the terminal portion to the base end portion on the tilted surface 7*a* (see FIG. 8).

In the present embodiment, the unit coupling member 56 further includes third contact surfaces 7*d* respectively corresponding to the first contact surfaces 71*b* and second concave portions 7*e* respectively corresponding to the rollers 71*a* (see FIG. 7 and FIG. 8).

The third contact surface 7*d* is a surface that faces the first side D21 and is capable of coming into contact with the first contact surface 71*b* of the movable member 71. The second contact surface 7*b* is formed at a position corresponding to the first contact surface 71*b* in the unit coupling member 56.

The second concave portion 7*e* faces the first side D21 and is arranged adjacent to the base end portion of the tilted surface 7*a* in the first direction D1 (see FIG. 7 and FIG. 8). The second concave portion 7*e* is provided at a position corresponding to the roller 71*a* in the unit coupling member 56. In the present embodiment, the second concave portions 7*e* are provided at two positions in the unit coupling member 56.

A part of the roller 71*a* can be inserted into the second concave portion 7*e*. Specifically, a part of the roller 71*a* including an edge on the second side D22 can be inserted into the second concave portion 7*e*.

When the movable member 71 moves in conjunction with the movement of the operation member 103 in the second operation direction, the following third operation is caused. In the third operation, the roller 71*a* is detached from the first concave portion 7*c* and rolls from the terminal portion to the base end portion on the tilted surface 7*a*. After that, a part of the roller 71*a* enters the second concave portion 7*e*, and the first contact surface 71*b* abuts against the third contact surface 7*d* (see FIG. 8).

Therefore, when the heating unit 5*a* is separated from the fixing unit 5*b* toward the first side D21, the force of the first bias member 72 is not applied to the rollers 71*a*. Therefore, the durability of the rollers 71*a* is improved.

On the other hand, when the movable member 71 moves in conjunction with the movement of the operation member 103 in the first operation direction, the following fourth operation is caused. In the fourth operation, the roller 71*a* is detached from the second concave portion 7*e*, and the first contact surface 71*b* moves away from the third contact surface 7*d*. After that, the roller 71*a* rolls from the base end portion to the terminal portion on the tilted surface 7*a* (see FIG. 7).

In the image forming apparatus 10, by the action of the rollers 71*a*, the heating unit 5*a* can smoothly approach or move away from the fixing unit 5*b*.

In the present embodiment, the movable member 71 further includes rollers 71*f* (see FIG. 7). The rollers 71*f* are in contact with the guide member 70. When the movable member 71 moves along the first direction D1, the rollers 71*f* roll on the surface of the guide member 70.

By the action of the rollers 71*f*, the heating unit 5*a* can smoothly approach or move away from the fixing unit 5*b*.

The coupling mechanism 560 includes a shaft portion 561, an engagement portion 562, and a second bias member 563 (see FIG. 10 and FIG. 11).

The shaft portion 561 is formed to protrude toward the first side D21 of the second direction D2 from the heating unit 5*a*. In the present embodiment, a first end of the shaft portion 561 is fixed to the duct forming member 541.

The shaft portion 561 is inserted into a through-hole 56*a* that is formed in the unit coupling member 56 and is provided along the second direction D2. The engagement portion 562 is formed at a second end of the shaft portion 561. The engagement portion 562 is larger than an inner diameter of the through-hole 56*a*.

The engagement portion 562 engages with an edge portion of the through-hole 56*a* in the unit coupling member 56 when the unit coupling member 56 moves toward the first side D21 of the second direction D2, to thus prevent the shaft portion 561 from coming out of the through-hole 56*a*.

The second bias member 563 is arranged between the unit coupling member 56 and the heating unit 5*a*. Thus, the second bias member 563 functions as a spacer that forms the gap 5600 between the unit coupling member 56 and the heating unit 5*a*.

In the present embodiment, the second bias member 563 is arranged between the unit coupling member 56 and the duct forming member 541 so as to form the gap 5600 between the unit coupling member 56 and the duct forming member 541.

When the unit movement mechanism 7 is in the biased state, the engagement with the unit coupling member 56 by the engagement portion 562 is released, and the second bias member 563 elastically biases the duct forming member 541 toward the second side D22 while forming the gap 5600 (see FIG. 10). Thus, the heating unit 5*a* moves from the evacuation position to the reference position to be positioned at the reference position.

On the other hand, when the unit movement mechanism 7 is in the pulled state, the engagement portion 562 engages with the unit coupling member 56, and a force that pulls the duct forming member 541 toward the first side D21 of the second direction D2 acts on the duct forming member 541 from the shaft portion 561. Thus, the heating unit 5*a* moves from the reference position to the evacuation position.

Figure 6:
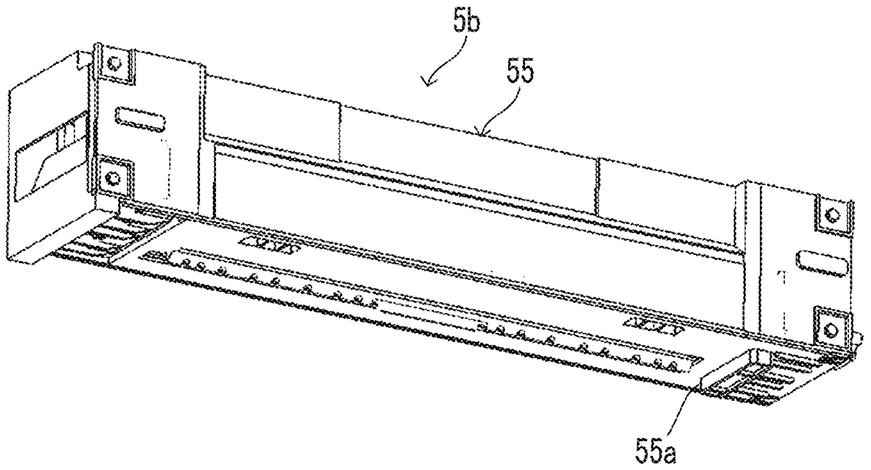
FIG. 6 is a perspective view of a fixing unit in the image forming apparatus according to the embodiment.

Further, the image forming apparatus 10 further includes a first direction bias mechanism 8 attached to an inner surface of the cover member 102 (see FIG. 7 and FIG. 8). Furthermore, the second support member 55 of the fixing unit 5*b* includes a protrusion portion 55*a* protruding from a lower surface of the second support member 55 (see FIG. 4 to FIG. 6).

The first direction bias mechanism 8 includes a spring 80, a spring case 81, and a cap portion 82 (see FIG. 7).

The spring case 81 houses the spring 80. The cap portion 82 is attached to be movable with respect to the spring case 81. The spring 80 is an example of an elastic member.

When the cover member 102 is positioned at the closing position, the spring 80 is sandwiched between the cover member 102 and the second support member 55 of the fixing unit 5*b*. In the present embodiment, the spring 80 and the cap portion 82 are sandwiched between the cover member 102 and the second support member 55.

By the spring 80 being sandwiched between the cover member 102 and the second support member 55, the second support member 55 is biased in an attachment direction D12 by the elastic force (see FIG. 7). The attachment direction D12 is a direction opposite to a drawing direction D11 of the fixing unit 5*b*.

Furthermore, by a force that the second support member 55 receives from the spring 80 when the cover member 102 is positioned at the closing position, the protrusion portion 55*a* abuts against a beam pipe 12*b* which is one of the lower support portions 12.

The fixing unit 5*b* is positioned in the first direction D1 by the action of the spring 80 and the protrusion portion 55*a*. It is noted that the first direction bias mechanism 8 may alternatively be attached to the second support member 55 of the fixing unit 5*b*.

The first link member 731 moves along the first direction D1 in conjunction with the movement of the operation member 103. The first link member 731 is an example of a first direction link member.

The first link member 731 is arranged along the first direction D1 from an end portion of the main body 1 in the first direction D1 on a side where the operation member 103 is arranged to a position opposing the unit coupling member 56 (see FIG. 7 and FIG. 8).

Therefore, there is a fear that the first link member 731 will inhibit the flow of air from one of the pair of fans 6 toward one of the pair of inflow openings 540*b*.

In the present embodiment, one or more ventilation openings 731*a* are formed at a portion of the first link member 731 that is positioned between one of the pair of fans 6 and one of the pair of inflow openings 540*b* (see FIG. 7 and FIG. 11). In the example shown in FIG. 11, a plurality of ventilation openings 731*a* are formed in the first link member 731.

The air blown out from one of the pair of fans 6 flows smoothly toward one of the pair of inflow openings 540*b* via the ventilation openings 731*a*.

Figure 12:
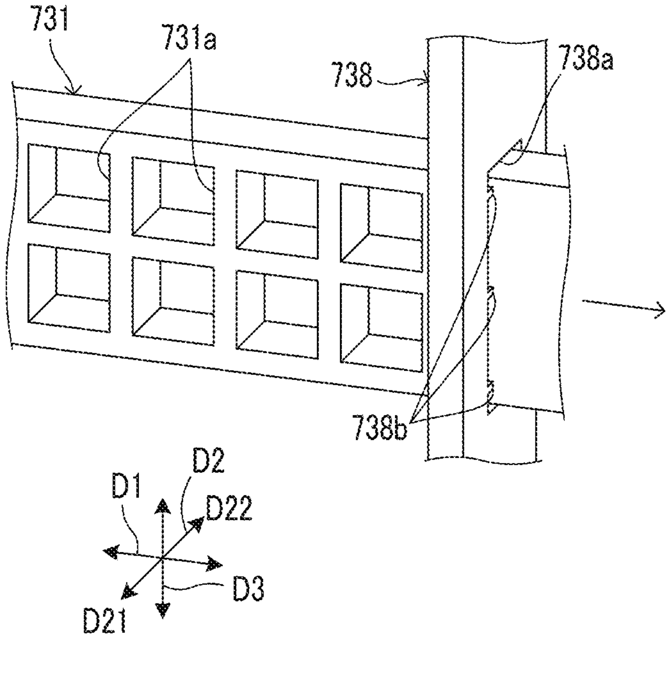
FIG. 12 is a perspective view showing a part of a first link member and a part of a restriction frame member in the image forming apparatus according to the embodiment.

The link mechanism 7*x* further includes a restriction frame member 738 formed with a through-hole 738*a* through which the first link member 731 penetrates in the first direction D1 (see FIG. 12). The restriction frame member 738 restricts the movement of the first link member 731 in the second direction D2 and guides the first link member 731 along the first direction D1.

The restriction frame member 738 includes a plurality of guide ribs 738*b* that protrude from an edge portion of the through-hole 738*a* toward the through-hole 738*a* (see FIG. 12). The plurality of guide ribs 738*b* abut against edge portions of the ventilation openings 731*a* in the first link member 731. Thus, when the first link member 731 moves along the first direction D1, the edge portions of the ventilation openings 731*a* in the first link member 731 slide against the plurality of guide ribs 738*b*.

The plurality of guide ribs 738*b* smoothly guide the first link member 731 along the first direction D1 without getting caught in the ventilation openings 731*a*.

[Notes of Disclosure]

Hereinafter, a general outline of the disclosure extracted from the embodiment described above will be noted. It is noted that the respective configurations and processing functions described in the notes below can be sorted and arbitrarily combined as appropriate.

<Note 1>

An image forming apparatus, including:

a main body formed with an exposure opening through which an inside is exposed to an outside;

a fixing unit which is arranged along a first direction on an inner side of the exposure opening in the main body, and includes a fixing member which is heated and a pressure member which biases a sheet toward the fixing member;

a heating unit which is arranged in the main body along the first direction while being arranged next to the fixing unit in a second direction orthogonal to the first direction, and includes a heater which heats the fixing member;

an operation member capable of moving by being operated;

a unit movement mechanism which is arranged on a side opposite to a side of the fixing unit in the second direction with respect to the heating unit in the main body, and causes the heating unit to move between a reference position provided along the fixing unit and an evacuation position farther away from the fixing unit than the reference position in conjunction with a movement of the operation member; and a pair of fans which are arranged with an interval provided therebetween in the first direction on a side opposite to a side of the heating unit in the second direction with respect to the unit movement mechanism in the main body, and blow air toward the heating unit, in which when the heating unit is present at the evacuation position, the fixing unit can be drawn out from inside the main body along the first direction, the heating unit includes a ventilation duct including a hollow portion formed along the first direction, a pair of inflow openings which are formed opposite to the pair of fans and are in communication with the hollow portion, and a discharge opening which is formed between the pair of inflow openings in the first direction and is in communication with the hollow portion, and the unit movement mechanism includes a unit coupling member which is coupled to the heating unit while a gap is provided between the unit coupling member and the discharge opening at a position between the pair of inflow openings in the first direction, and a link mechanism which transmits the movement of the operation member to the unit coupling member.

<Note 2>

The image forming apparatus according to note 1, in which the operation member is arranged at one end of the main body in the first direction, the link mechanism includes a first direction link member which is arranged along the first direction from an end portion of the main body in the first direction on a side where the operation member is arranged to a position opposing the unit coupling member, and moves along the first direction in conjunction with the movement of the operation member, and the first direction link member is formed with a ventilation opening at a portion thereof positioned between one of the pair of fans and one of the pair of inflow openings.

<Note 3>

The image forming apparatus according to note 2, in which the link mechanism includes a restriction frame member which is formed with a through-hole through which the first direction link member penetrates in the first direction, and restricts a movement of the first direction link member in the second direction, the restriction frame member includes a plurality of guide ribs which protrude from an edge portion of the through-hole toward the through-hole and abut against an edge portion of the ventilation opening in the first direction link member, and when the first direction link member moves along the first direction, the edge portion of the ventilation opening in the first direction link member slides against the plurality of guide ribs.

<Note 4>

The image forming apparatus according to any one of notes 1 to 3, in which the main body includes a cover member which is rotatable between a closing position at which the exposure opening is closed and an opening position at which the exposure opening is opened, the cover member doubles as the operation member, when the cover member moves from the closing position to the opening position, the link mechanism causes the heating unit to move from the reference position to the evacuation position, and further, when the cover member moves from the opening position to the closing position, the link mechanism causes the heating unit to move from the evacuation position to the reference position.

<Note 5>

The image forming apparatus according to any one of notes 1 to 4, in which the heater is a heating device that uses an electromagnetic induction heating system.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a main body formed with an exposure opening through which an inside is exposed to an outside;

a fixing unit which is arranged along a first direction on an inner side of the exposure opening in the main body, and includes a fixing member which is heated and a pressure member which biases a sheet toward the fixing member;

a heating unit which is arranged in the main body along the first direction while being arranged next to the fixing unit in a second direction orthogonal to the first direction, and includes a heater which heats the fixing member;

an operation member capable of moving by being operated;

a unit movement mechanism which is arranged on a side opposite to a side of the fixing unit in the second direction with respect to the heating unit in the main body, and causes the heating unit to move between a reference position provided along the fixing unit and an evacuation position farther away from the fixing unit than the reference position in conjunction with a movement of the operation member; and a pair of fans which are arranged with an interval provided therebetween in the first direction on a side opposite to a side of the heating unit in the second direction with respect to the unit movement mechanism in the main body, and blow air toward the heating unit, wherein when the heating unit is present at the evacuation position, the fixing unit can be drawn out from inside the main body along the first direction, the heating unit includes a ventilation duct including a hollow portion formed along the first direction, a pair of inflow openings which are formed opposite to the pair of fans and are in communication with the hollow portion, and a discharge opening which is formed between the pair of inflow openings in the first direction and is in communication with the hollow portion, and the unit movement mechanism includes a unit coupling member which is coupled to the heating unit while a gap is provided between the unit coupling member and the discharge opening at a position between the pair of inflow openings in the first direction, and a link mechanism which transmits the movement of the operation member to the unit coupling member.

2. The image forming apparatus according to claim 1, wherein the operation member is arranged at one end of the main body in the first direction, the link mechanism includes a first direction link member which is arranged along the first direction from an end portion of the main body in the first direction on a side where the operation member is arranged to a position opposing the unit coupling member, and moves along the first direction in conjunction with the movement of the operation member, and the first direction link member is formed with a ventilation opening at a portion thereof positioned between one of the pair of fans and one of the pair of inflow openings.

3. The image forming apparatus according to claim 2, wherein the link mechanism includes a restriction frame member which is formed with a through-hole through which the first direction link member penetrates in the first direction, and restricts a movement of the first direction link member in the second direction, the restriction frame member includes a plurality of guide ribs which protrude from an edge portion of the through-hole toward the through-hole and abut against an edge portion of the ventilation opening in the first direction link member, and when the first direction link member moves along the first direction, the edge portion of the ventilation opening in the first direction link member slides against the plurality of guide ribs.

4. The image forming apparatus according to claim 1, wherein the main body includes a cover member which is rotatable between a closing position at which the exposure opening is closed and an opening position at which the exposure opening is opened, the cover member doubles as the operation member, when the cover member moves from the closing position to the opening position, the link mechanism causes the heating unit to move from the reference position to the evacuation position, and further, when the cover member moves from the opening position to the closing position, the link mechanism causes the heating unit to move from the evacuation position to the reference position.

5. The image forming apparatus according to claim 1, wherein the heater is a heating device that uses an electromagnetic induction heating system.

* * * * *